United States Patent
Wheeler et al.

(10) Patent No.: US 9,830,061 B1
(45) Date of Patent: Nov. 28, 2017

(54) METHODS, SYSTEMS, AND MEDIA FOR PROVIDING MEDIA GUIDANCE WITH CONTEXTUAL CONTROLS

(71) Applicant: Google Inc., Mountain View, CA (US)

(72) Inventors: Aaron Joseph Wheeler, San Francisco, CA (US); David Mark Halloran, San Francisco, CA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 14/248,559

(22) Filed: Apr. 9, 2014

(51) Int. Cl.
*G06F 3/0484* (2013.01)
*G06F 3/0481* (2013.01)
*G06F 3/0482* (2013.01)

(52) U.S. Cl.
CPC ........ *G06F 3/04847* (2013.01); *G06F 3/0482* (2013.01); *G06F 3/04817* (2013.01); *G06F 3/04842* (2013.01)

(58) Field of Classification Search
USPC ....... 715/716, 838, 709, 710, 711, 712, 713, 715/719, 720, 764, 781, 823; 725/37, 725/102, 38, 56, 88; 348/E5.104, E5.105
See application file for complete search history.

(56) References Cited

U.S. PATENT DOCUMENTS

| | | | | |
|---|---|---|---|---|
| 5,818,439 A | * | 10/1998 | Nagasaka | G06F 17/30793 348/E7.073 |
| 2006/0059526 A1 | * | 3/2006 | Poslinski | G11B 27/34 725/88 |
| 2007/0100882 A1 | * | 5/2007 | Hochwarth | G06Q 10/10 |
| 2007/0186186 A1 | * | 8/2007 | Both | G06F 3/04817 715/821 |
| 2008/0034325 A1 | * | 2/2008 | Ording | G06F 3/04817 715/838 |
| 2008/0319856 A1 | * | 12/2008 | Zito | G06F 17/30873 705/14.73 |
| 2009/0013048 A1 | * | 1/2009 | Partaker | G06Q 10/107 709/206 |
| 2009/0024927 A1 | * | 1/2009 | Schrock | G06Q 30/02 715/722 |
| 2009/0193465 A1 | * | 7/2009 | Yi | H04N 5/44543 725/41 |
| 2010/0082585 A1 | * | 4/2010 | Barsook | G06F 17/3079 707/706 |
| 2010/0122166 A1 | * | 5/2010 | Chien | G06F 3/04817 715/716 |

(Continued)

*Primary Examiner* — Doon Chow
*Assistant Examiner* — Wendy Nicholas
(74) *Attorney, Agent, or Firm* — Byrne Poh LLP

(57) ABSTRACT

Methods, systems, and media for providing media guidance with contextual controls are provided. In some embodiments, the method comprises: causing a user interface to be presented that includes media interface elements, wherein each of the media interface elements is a selectable object that represents at least one media content item; determining that a media interface element from the media interface elements has been selected; in response to determining that the media interface element has been selected, causing the at least one media content item corresponding to the selected media interface element to be presented in a portion of the user interface; and concurrently with causing the at least one media content item to be presented, causing a control interface to be presented that is associated with the selected media interface element.

21 Claims, 6 Drawing Sheets

(56) References Cited

U.S. PATENT DOCUMENTS

| | | | |
|---|---|---|---|
| 2013/0007617 A1* | 1/2013 | Mackenzie | G06F 17/30017 715/716 |
| 2013/0054758 A1* | 2/2013 | Imes | H04L 12/2827 709/219 |
| 2014/0195911 A1* | 7/2014 | Cho | G06F 3/0488 715/719 |
| 2014/0215398 A1* | 7/2014 | Fleizach | G06F 3/04842 715/823 |
| 2014/0282250 A1* | 9/2014 | Riddell | G06F 3/0485 715/830 |

* cited by examiner

METHODS, SYSTEMS, AND MEDIA FOR PROVIDING MEDIA GUIDANCE WITH CONTEXTUAL CONTROLS

TECHNICAL FIELD

The disclosed subject matter relates to methods, systems, and media for providing media guidance with contextual controls.

BACKGROUND

Navigating a user interface using a directional input device frustrates many users because certain functions can only be performed by selecting a particular button on the input device, or by navigating to a particular location in the user interface. Many user input devices, such as remote controls, include buttons for performing specific actions in a user interface, but they can be hard to locate and the function which they perform may be unclear. Providing options in a particular location of the user interface requires the user to navigate to that particular location of the user interface, which may require many directional inputs depending on a portion of the user interface that is currently highlighted. Moreover, options on these interfaces often obstruct the user's viewing experience.

Accordingly, it is desirable to provide methods, systems, and media for providing media guidance with contextual controls.

SUMMARY

In accordance with various embodiments of the disclosed subject matter, mechanisms for providing media guidance with contextual controls are provided.

In some embodiments of the disclosed subject matter, a method for media guidance is provided, the method comprising: causing a user interface to be presented that includes a plurality of media interface elements, wherein each of the plurality of media interface elements is a selectable object that represents at least one media content item; determining, using a hardware processor, that a media interface element from the plurality of media interface elements has been selected; in response to determining that the media interface element from the plurality of media interface elements has been selected, causing the at least one media content item corresponding to the selected media interface element to be presented in a portion of the user interface, wherein the selected media interface element identifies the at least one media content item; and concurrently with causing the at least one media content item corresponding to the selected media interface element to be presented, causing a control interface to be presented that is associated with the selected media interface element, wherein the control interface includes a plurality of controls that control playback of the at least one media content item being presented in the portion of the user interface.

In some embodiments of the disclosed subject matter, a system for media guidance is provided, the system comprising a hardware processor that is configured to: cause a user interface to be presented that includes a plurality of media interface elements, wherein each of the plurality of media interface elements is a selectable object that represents at least one media content item; determine that a media interface element from the plurality of media interface elements has been selected; in response to determining that the media interface element from the plurality of media interface elements has been selected, cause the at least one media content item corresponding to the selected media interface element to be presented in a portion of the user interface, wherein the selected media interface element identifies the at least one media content item; and concurrently with causing the at least one media content item corresponding to the selected media interface element to be presented, cause a control interface to be presented that is associated with the selected media interface element, wherein the control interface includes a plurality of controls that control playback of the at least one media content item being presented in the portion of the user interface.

In some embodiments of the disclosed subject matter, non-transitory computer-readable media containing computer executable instructions that, when executed by a processor, cause the processor to perform a method for media guidance is provided, the method comprising: causing a user interface to be presented that includes a plurality of media interface elements, wherein each of the plurality of media interface elements is a selectable object that represents at least one media content item; determining that a media interface element from the plurality of media interface elements has been selected; in response to determining that the media interface element from the plurality of media interface elements has been selected, causing the at least one media content item corresponding to the selected media interface element to be presented in a portion of the user interface, wherein the selected media interface element identifies the at least one media content item; and concurrently with causing the at least one media content item corresponding to the selected media interface element to be presented, causing a control interface to be presented that is associated with the selected media interface element, wherein the control interface includes a plurality of controls that control playback of the at least one media content item being presented in the portion of the user interface.

In some embodiments of the disclosed subject matter, a system for media guidance is provided, the system comprising: means for causing a user interface to be presented that includes a plurality of media interface elements, wherein each of the plurality of media interface elements is a selectable object that represents at least one media content item; means for determining that a media interface element from the plurality of media interface elements has been selected; in response to determining that the media interface element from the plurality of media interface elements has been selected, means for causing the at least one media content item corresponding to the selected media interface element to be presented in a portion of the user interface, wherein the selected media interface element identifies the at least one media content item; and concurrently with causing the at least one media content item corresponding to the selected media interface element to be presented, means for causing a control interface to be presented that is associated with the selected media interface element, wherein the control interface includes a plurality of controls that control playback of the at least one media content item being presented in the portion of the user interface.

In some embodiments, the plurality of media interface elements is arranged along a direction from a position of the user interface.

In some embodiments, the plurality of media interface elements includes a first media interface element that represents a plurality of media content items, and wherein the control interface includes a first set of controls for navigating through the plurality of media content items.

In some embodiments, the system further comprises: means for determining that a media content item from the plurality of media content items has been selected using the first set of controls; and means for activating a second set of controls for controlling the playback of the selected media content item.

In some embodiments, the first set of controls is inhibited from being presented in response to activating the second set of controls.

In some embodiments, the system further comprises: means for causing the first set of controls to be removed from the user interface and means for causing the second set of control to be presented in the user interface, wherein the second set of controls is aligned with the selected media interface element.

In some embodiments, the first set of controls for navigating through the plurality of media content items further comprises: a first indicator that indicates a first navigation position from a plurality of navigation positions, wherein each of the plurality of navigation positions corresponds to a media content item from the plurality of media content items and wherein the first navigation position corresponds to the at least one media content item that is being presented; and a second indicator that indicates a second navigation position from the plurality of navigation positions, wherein the second navigation position corresponds to one of the plurality of media content items that has been navigated to.

In some embodiments, the system further comprises: means for determining whether the selected media interface element is associated with a single media content item or a plurality of media content items; and means for selecting the control interface that appears from the selected media interface element based on the determination.

In some embodiments, the system further comprises: means for receiving an input from a user input device; means for determining a first direction associated with the received input; and means for causing one of the plurality of controls in the control interface to be highlighted or causing one of the plurality of media interface elements to be highlighted based on the determined direction.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
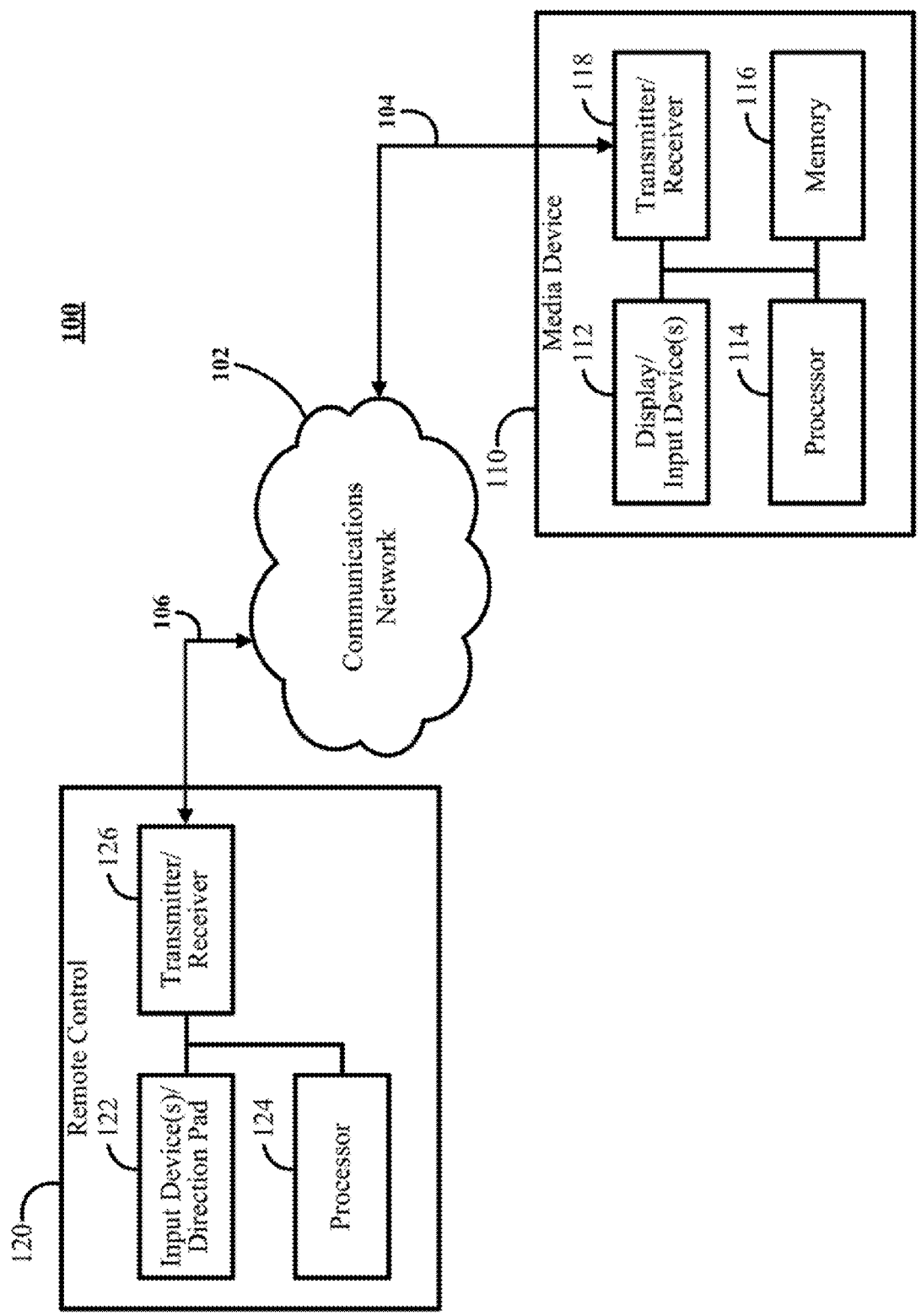
FIG. 1 shows an example of a schematic diagram of a system, including a remote control and a media device, suitable for implementation of mechanisms described herein for providing media guidance with contextual controls in accordance with some embodiments of the disclosed subject matter.

In accordance with some embodiments of the disclosed subject matter, mechanisms (which can include methods, systems, and/or media) for providing media guidance with contextual controls are provided.

In some embodiments, the mechanisms described herein can cause a user interface that can be navigated using directional inputs received from a user input device to be presented. For example, a device using the mechanisms described herein can cause a user interface that includes one or more media interfaces corresponding to various media items that can be played back on the device to be presented. These media interfaces can be presented, for example, in a grid of media interfaces, as a column of media interfaces, as a row of media interfaces, as multiple rows of media interfaces with each row representing a group of related media interfaces, and/or using any other suitable technique or techniques.

It should be noted that the one or more media interfaces can include any suitable information for presentation. For example, in some embodiments, the media interface can identify a media content item that corresponds to the media interface. In a more particular example, the media interface can include any suitable identifier, such as a thumbnail, an image, and/or any suitable text. In some embodiments, how a particular identifier is presented can be based on one or more items of metadata associated with the media content with which the media interface is associated. For example, the media identifier can include title information based on title metadata of the media content. As another example, the media identifier can include an image based on thumbnail metadata of the media content and/or a frame of image data from the metadata of the media content.

It should also be noted that the media content item that corresponds to a media interface can include any suitable type(s) of media content. For example, media content can include audio content and/or video content. As another example, media content can include print media content or image media content. As still another example, media content can include a collection of media content, such as a playlist of videos, a playlist of songs, a collection of images, etc. As a further example, media content can include subscription based media content, such as podcasts, online magazine subscriptions, etc. As another further example, media content can include interactive media content, such as applications and video games. Media content can include any suitable combinations of content and/or any other suitable content.

In some embodiments, the mechanisms described herein can receive directional inputs (e.g., issued by a user input device), and can highlight or place in focus a particular media interface based on the received directional input. For example, in response to determining that the media interface represents a playlist or collection of media content items, the mechanisms described herein can cause various media identifiers corresponding to the videos to be sequentially highlighted in response to a device using the mechanisms receiving directional inputs. In a more particular example, the mechanisms described herein can cause a first media interface corresponding to a first video to be highlighted.

In some embodiments, the media interface can include one or more contextual controls. For example, the media interface can include a control interface having controls relating to playback of the selected media content item. In a more particular example, the contextual controls in the control interface can be selected in response to determining that the media type of the selected media content item is a video content item.

It should be noted that the contextual controls can be selected based on any suitable criterion. For example, media playback options in a control interface can be selected based on media type (e.g., particular options for video playback), media interface type (e.g., particular options for a playlist of media content items), content creator (e.g., particular options for accessing or subscribing to other content), user information (e.g., particular options for sharing and/or social media), etc.

It should also be noted that contextual controls can be presented in any suitable manner. For example, in response to concurrently presenting the media interface that identifies the currently presented media content item along with the media content, the mechanisms can integrate the contextual controls within the media interface such that the contextual controls, which were previously unavailable while navigating through media interfaces, are revealed to control the selected media interface or one or more media content items associated with the selected media interface. In a more particular example, the contextual controls can be presented as a portion of the media interface. In another more particular example, the contextual controls can be associated with an animation file that, when executed on a media devices, causes the elements associated with the contextual controls to fade in, slide out, and/or any other suitable technique from the media interface.

It should further be noted that, although the contextual controls are generally described herein as being presented in response to selecting a media interface or a media content item, this is merely illustrative. In some embodiments, the contextual controls can be presented concurrently with a corresponding media interface and corresponding media content in response to receiving a suitable directional input (e.g., a "down" input from a user input device).

In some embodiments, the selection of one of the contextual controls can cause one or more secondary controls to be presented (e.g., where the originally displayed contextual controls slide into the media interface while other contextual controls slide out from the media interface), can modify the presentation of the media interfaces and additional media interfaces in the user interface (e.g., pagination where additional media interfaces are displayed), can modify the currently presented media content item (e.g., pause the video content item), and/or can modify the media interface (e.g., load related video content items or related collections of video content items). For example, in response to determining that a media interface represents a collection of video content items, a first group of contextual controls can be presented that includes navigation options (e.g., having indicators that show which video content item in the collection of video content items is being played back and that show which video content item is currently being navigated to) and, upon selecting a media content item, a second group of contextual controls can be presented that includes video playback options (e.g., for controlling the playback of the video content item).

It should be noted that any suitable contextual control can be provided. For example, media playback options can include any suitable media playback option, such as playing the media content item, pausing the media content item, rewinding the media content item, fast forwarding the media content item, stopping the media content item, skipping the media content item, liking the media content item or providing any other suitable indication of sentiment, requesting that related media content items be presented, placing the media content item in a queue for consumption at a later time, subscribing to a content provider providing the media content item, accessing other content items provided by the content provider that is providing the media content item, and/or any other suitable media playback option relating to the selected media content item.

These and other features for providing a media interface with multiple control interfaces are described herein in connection with FIGS. 1-3D.

FIG. 1 shows an example 100 of a generalized schematic diagram of a system that includes a media device and a remote control on which the mechanisms for providing media guidance with contextual controls as described herein can be implemented in accordance with some embodiments of the disclosed subject matter. As illustrated, system 100 can include a remote control 120 that can be used to control one or more media devices, such as a media device 110. Remote control 120 can be connected by a communications link 106 to a communications network 102 that can be linked via a communications link 104 to media device 110.

In a more particular example, remote control 120 can include an input device(s)/direction pad 122 and/or any other suitable directional input. For example, input device(s)/direction pad 122 can include a direction pad and a select button. Additionally or alternatively, any other suitable buttons or other input devices can be included in input device(s)/direction pad 122 such as number buttons, volume and channel controls, etc. In some embodiments, remote control 120 can further include a processor 124, and a transmitter/receiver 126, which can be interconnected with each other and/or with input device(s)/direction pad 122.

In some embodiments, remote control 120 can include memory and/or storage (not shown) for storing a computer program for controlling processor 124. For example, the computer program can be stored in read-only memory (ROM), electrically programmable read only memory (EPROM), electrically erasable programmable read only memory (EEPROM), flash memory, etc.

Processor 124 can use the computer program to cause signals to be transmitted from remote control 120 through communications link 106 and communications network 102 to media device 110 via communications link 104. These signals can be transmitted using transmitter/receiver 126, which can include one or more transmitters, receivers, antennas, transmitter/receivers, etc. Transmitter/receiver 126 can transmit and/or receive signals using any suitable technologies and/or frequencies. For example, transmitter/receiver 126 can transmit and/or receive radio signals, infrared signals, near-infrared signals, ultrasonic signals, etc.

Communications links 104 and 106 can be any communications links suitable for communicating data between remote control 120 and media device 110, such as radio frequency links, infrared links, near-infrared links, wireless links, network links, HDMI links, USB links, any other suitable communications links, or any suitable combination of such links. In some embodiments, communication link 104 and communication link 106 can be the same communication link or different communication links. For example, a radio signal (such as a microwave signal) can be sent from remote control 120 through communications network 102 (e.g., a space between remote control 120 and media device 110), which can then be received at media device 110. In such an example, communication link 104 and communication link 106 are the same (e.g., the microwave signal).

As another example, a radio signal (such as a microwave signal) can be sent from remote control 120 and received at a converter (not shown) that converts the microwave signal to a near-infrared signal. In such an example, the converter can transmit the near-infrared signal, which can then be received by media device 110. In this example, communication link 106 is the radio signal, and communication link 104 is the near-infrared signal and the converter is part of communications network 102.

In some embodiments, input device(s)/direction 122 can include a number of switches that, when activated, indicate a directional input. For example, input device(s)/direction 122 can include a button that a user can press to indicate a direction. This button can activate one or more of the switches, and a signal from the one or more switches can be correlated by processor 124 with a direction indicated by pressing the button.

Input device(s)/direction 122 and processor 124 can be configured to accept any suitable number of inputs for various directions in accordance with some implementations. For example, processor 124 can be configured to detect inputs in four directions (e.g., up, down, left and right) from input device(s)/direction 122. In another example, processor 124 can be configured to detect eight directional inputs (e.g., up, down, left, right and intermediate directions, such as, up-right diagonal, up-left diagonal, down-right diagonal, and down-left diagonal) from input device(s)/direction 122. In yet another example, processor 124 can be configured to detect inputs in any arbitrary direction from input device(s)/direction 122. In such an example, input device(s)/direction 122 can include touch sensors that can be used to detect an arbitrary position of an input to input device(s)/direction 122.

In some embodiments, input device(s)/direction 122 can include any other suitable features such as an alphanumeric keypad, a power button, an input selection button, channel buttons, volume buttons, a volume mute button, media playback buttons (e.g., rewind, pause, play, and fast-forward buttons), a dedicated button that accesses downloadable applications for use by the media device, a microphone or other suitable audio input, a camera, etc. In some embodiments, input device(s)/direction 122 can include hardware buttons and/or software buttons (e.g., programmable buttons). In some implementations, input device(s)/direction 122 can also include other inputs, such as, a computer keyboard, a cursor-controller, a dial, a switchbank, a lever, a touchscreen, and/or any other suitable input device.

In some embodiments, system 100 can include one or more media devices 110, such as a media playback device for viewing media content listings and/or obtaining and presenting content items from various sources (e.g., broadcast content, on-demand content, locally stored content, Internet content, etc.). In some embodiments, remote control 120 and media device 110 can be local to each other or remote from each other. For example, remote control 120 and media device 110 can be located in the same room. In some embodiments, media device 110 can execute process 200 and/or present user interface 300, as described below in connection with FIGS. 2 and 3A-3D, respectively.

In some embodiments, media device 110 can include a display/input device 112, a processor 114, memory 116, and one or more transmitters, receivers, and/or transmitter/receivers 118, which can be interconnected.

In some embodiments, memory 116 can include a storage device, such as a hard drive, a digital video recorder, a solid state storage device, a removable storage device, or any other suitable device for storing guidance information and/or remote control instructions. In a more particular example, the storage device can store a computer program for controlling processor 114 in media device 110 (e.g., responsive to instructions received from remote control 120).

Processor 114 can use the computer program to present content on display/input device 112 and control a user interface, which can include user interface 300 as described below in connection with FIGS. 3A-3C, to allow a user to interact with the displayed content and to send and receive data through communication link 104 using transmitter/receiver 118. In some embodiments, transmitter/receiver 118 can transmit and/or receive radio signals, infrared signals, near-infrared signals, ultrasonic signals, etc. In cases where transmitter/receiver 126 of remote control 120 and transmitter/receiver 118 operate using different types of signals, a converter (not shown) can be used to convert instructions transmitted using one type of signal (e.g., a radio signal) to another type of signal (e.g., a near-infrared signal). It should be noted that data received through communications link 104 or any other communications links can be received from any suitable source. It should also be noted that transmitter/receiver 126 and transmitter/receiver 118 can operate using any suitable type of signals or combination thereof, including digital signals and/or analog signals.

Display/input device 112 can include input devices such as a computer keyboard, a cursor-controller, one or more buttons, a dial, a switchbank, a lever, a touchscreen, and/or any other suitable input device.

In some embodiments, remote control 120 and media device 110 can be any of a general purpose device such as a computer or a special purpose device such as a remote control, a smartphone, a tablet computer, a set-top box, a smart TV, a game console, a gamepad (e.g., a controller for a game console), a digital media receiver, a server, etc., or any suitable combination of such devices. Any of these general or special purpose devices can include any suitable components such as a hardware processor (which can be a microprocessor, digital signal processor, a controller, etc.), memory, communication interfaces, display controllers, input devices, etc. For example, media device 110 can be implemented as a set-top box, a digital media receiver, a smart TV, a television, a laptop computer, a personal computer, a server, a smartphone, a tablet computer, a game console, etc. In some embodiments, media device 110 can include a combination of devices, such as a television and a game console, or a television and a digital media receiver, where a first device (e.g., the game console or the digital media receiver) can execute the mechanisms described herein for presenting related content in a user interface navigated using directional controls, and a second device (e.g., the television) can be used to present a user interface for presenting related content in the user interface navigated using directional controls. Additionally or alternatively, instructions from a remote control can be received by a device that is not executing the mechanisms described herein (e.g., a television, a second screen device such as a smartphone, a game console) and these instructions can be relayed to a device that is executing the mechanisms described herein such as a digital media receiver, a streaming media device, or any other suitable device executing the mechanisms described herein.

Figure 2:
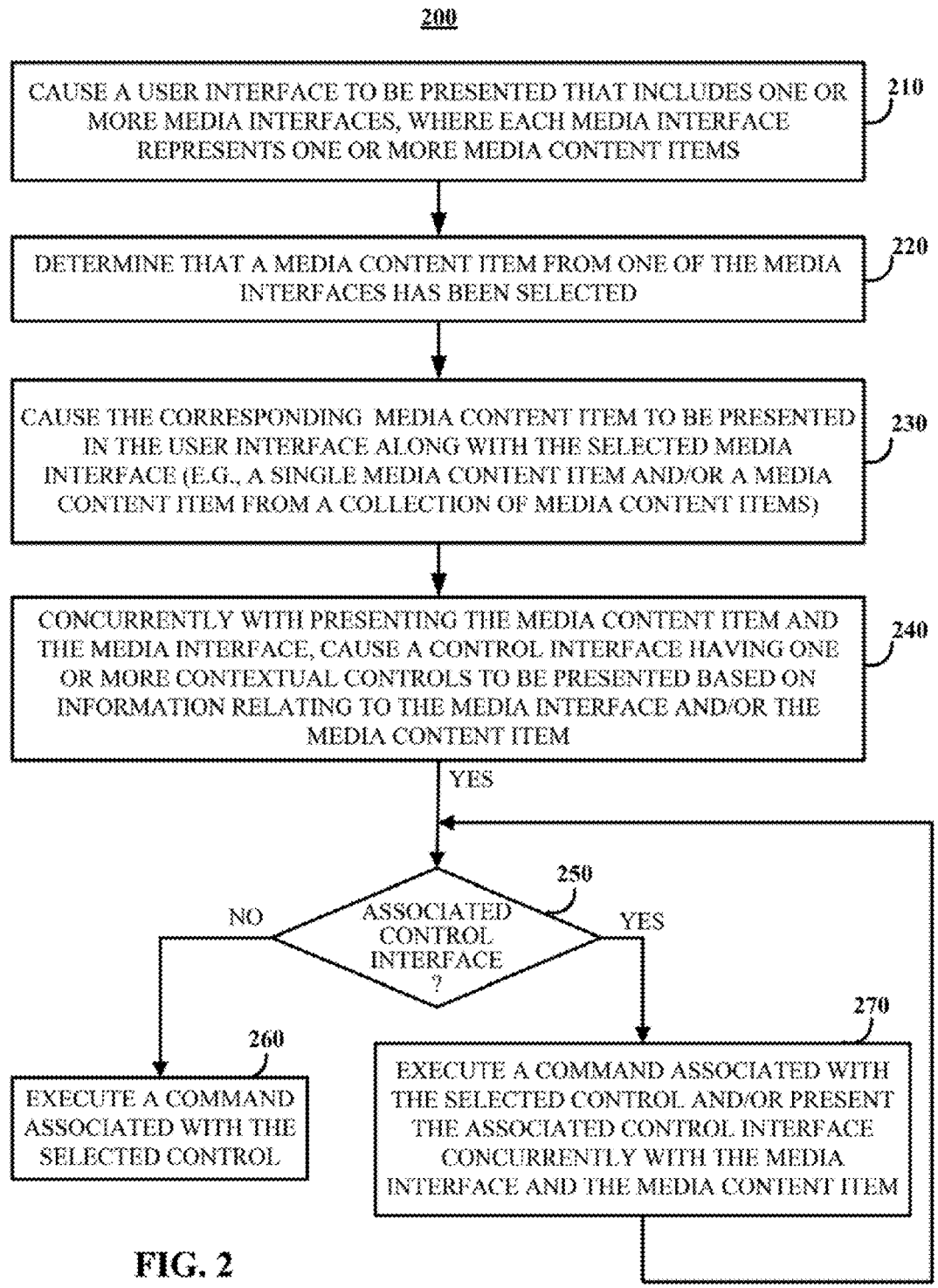
FIG. 2 shows an example of a process for providing a media interface that can include contextual controls in accordance with some embodiments of the disclosed subject matter.

Turning to FIG. 2, an illustrative example 200 of a process for providing media guidance with contextual controls is shown in accordance with some embodiments of the disclosed subject matter. In some embodiments, process 200 can begin at 210 by presenting a user interface that includes one or more media interfaces. For example, the user interface presented at 210 can include one or more media interfaces, where each media interface can be used to select one or more media content items and where each media interface can include media identifier elements that identify the media content items. Such a user interface can be presented, for example, in response to initiating an application for browsing and/or navigating through media content items.

In some embodiments, a user interface that includes multiple media interfaces corresponding to various media content items can be presented. These media interfaces can be presented, for example, in a grid of media interfaces, as a column of media interfaces, as a row of media interfaces, as multiple rows of media interfaces with each row representing a group of related media interfaces, and/or using any other suitable technique or techniques. For example, as shown in FIG. 3A, media device 110 can include a display 302 (which can be part of display 112, described above in connection with FIG. 1) on which user interface 300 can be presented. User interface 300 can include various media interfaces 304, 306, and 308 corresponding to different media assets. In some embodiments, user interface 300 can include any other suitable elements or other user interface components.

It should be noted that the one or more media interfaces can include any suitable information for presentation. For example, in some embodiments, the media interface can identify a media content item that corresponds to the media interface. In a more particular example, the media interface can include any suitable identifier, such as a thumbnail, an image, and/or any suitable text. In some embodiments, the media interface can identify the media content item from a plurality of media content items. For example, a thumbnail can identify a video content item from a plurality of video content items. In a more particular example, a thumbnail can identify a particular episode of a television program from a particular series of the television program.

In some embodiments, how a particular identifier is presented can be based on one or more items of metadata associated with the media content with which the media interface is associated. For example, the media identifier can include title information based on title metadata of the media content. As another example, the media identifier can include an image based on thumbnail metadata of the media content and/or a frame of image data from the metadata of the media content.

It should also be noted that the media content item that corresponds to a media interface can include any suitable type(s) of media content. For example, media content can include audio content and/or video content. As another example, media content can include print media content or image media content. As still another example, media content can include a collection of media content, such as a playlist of videos, a playlist of songs, a collection of images, etc. As a further example, media content can include subscription based media content, such as podcasts, online magazine subscriptions, etc. As another further example, media content can include interactive media content, such as applications and video games. Media content can include any suitable combinations of content and/or any other suitable content.

It should further be noted that process 200 can receive any suitable directional input such as up, down, left, right, diagonals (e.g., up-right, down-left, etc.), analog directional inputs (e.g., received from an analog stick on a game controller), and/or any other suitable directional inputs. In some embodiments, the directional input can be a discrete and directionally constrained input, such as a directional input received from a direction pad on a remote control, as opposed to a non-constrained input received from a pointing device such as a mouse or track pad. Note that, in some embodiments, a directional input, such as a swipe or flick, from a touch interface can be a directional input as described herein.

In some embodiments, the directional input can be received by a device executing process 200 as a command or instruction from an input device (e.g., remote control 120). For example, if the device executing process 200 is a television, the directional input can be received from a television remote control or a universal remote control. As another example, if the device executing process 200 is a game console, the directional input can be received from a controller associated with the game console. Additionally or alternatively, the directional input can be received by another device, and relayed to the device executing process 200. For example, if the device executing process 200 is a digital media receiver, the directional input can be received by a television to which the digital media receiver is coupled, and can be relayed to the digital media receiver using any suitable technique (e.g., using a communications protocol such as consumer electronics control (CEC), using an infrared blaster, over a network to which both are coupled such as a local area network, etc.). As another example, if the device executing process 200 is a television, the directional input can be received by a game console coupled to the television (e.g., from a controller associated with the game console), and can be relayed to the digital media receiver using any suitable technique (e.g., using CEC, or any other suitable communication protocol over any suitable communications link).

In some embodiments, a currently selectable element of user interface 300 can be highlighted. For example, as shown in FIG. 3A, media interface 304 is highlighted.

In some embodiments, a media interface can be highlighted using any suitable technique or combination of techniques. For example, a media interface can be highlighted by surrounding the element with a border of a particular color, brightness, pattern, etc. As another example, a color, shape, size, and/or any other suitable property or properties of the highlighted media interface can be altered with respect to other media identifier elements to indicate which media identifier element is highlighted. As yet another example, the highlighted media interface can be identified using text, graphics, or any other technique to differentiate the highlighted media identifier element. As still another example, the highlighted media interface can begin previewing the media asset to which it corresponds (e.g., can begin playing video of a video asset) to indicate that it is the highlighted media interface.

Figure 3A:
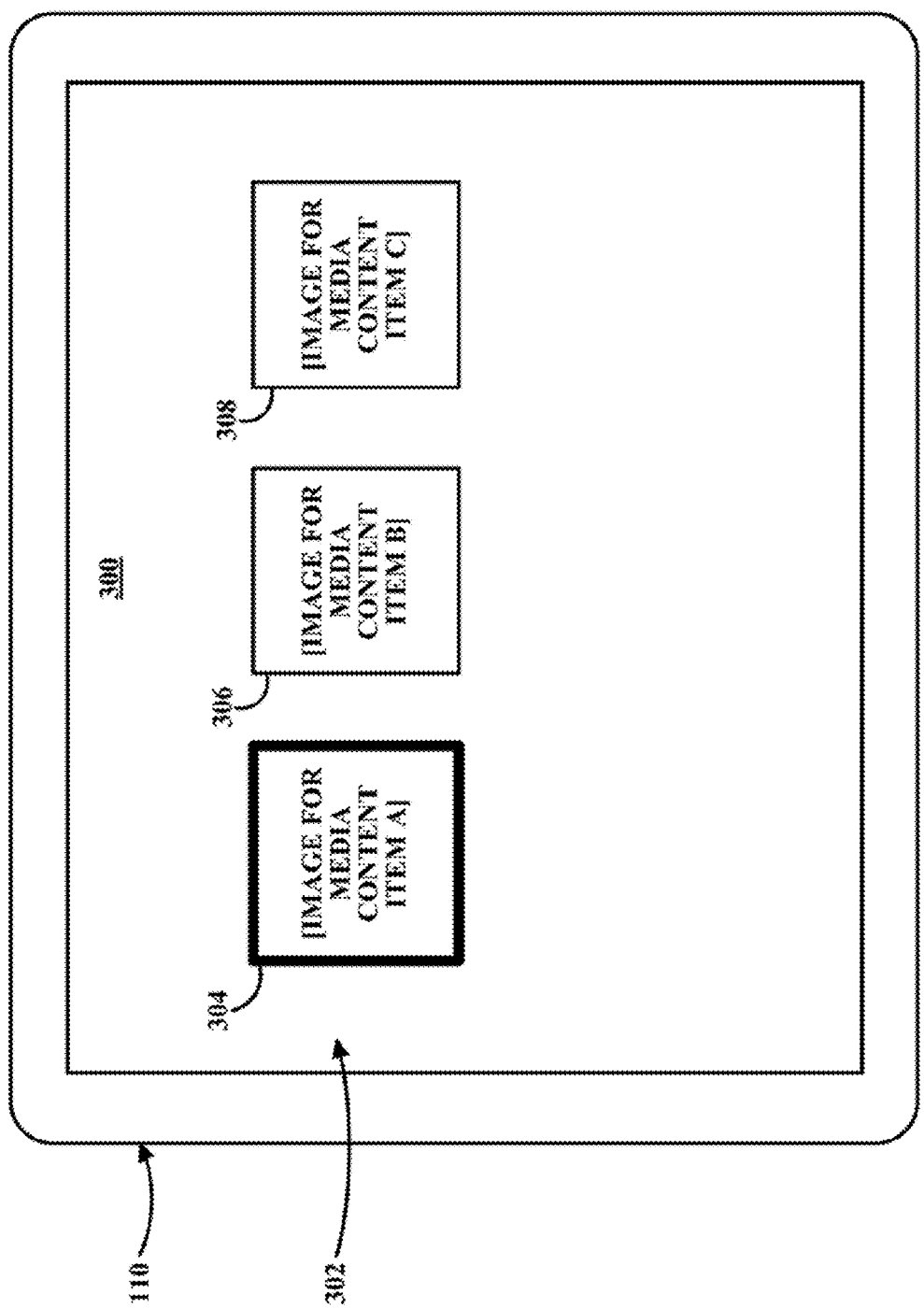
FIGS. 3A-3D show examples of a user interface that includes one or more media interfaces, where each media interface can include one or more contextual control interfaces, in accordance with some embodiments of the disclosed subject matter.

In some embodiments, as shown in FIG. 3A, media interfaces 306 and 308 can be de-emphasized, de-focused, and/or visually modified to appear inactive (e.g., by shading the media interface, by fading out the media interface, etc.). Additionally or alternatively, in response to highlighting a media interface, such as media interface 304, the other media interfaces presented in user interface 300 can be modified to appear inactive.

In some embodiments, in response to initiating an application for browsing through media assets, process 200 can cause a default media interface to be highlighted. For example, a media interface at a particular position can be highlighted initially after process 200 starts. The default media interface can be any media interface in any suitable position, such as an upper left media interface, a center media interface, a left-center media interface, or any other suitable position. Additionally or alternatively, process 200 can cause a media interface to be highlighted in response to receiving a directional input. For example, until a directional input is received, process 200 can inhibit any media interface from being highlighted, and upon receiving a directional input, can highlight a media interface based on the input. The media interface that is highlighted in response to receiving the directional input can be a media interface at a position based on the directional input (e.g., an upper media interface can be highlighted in response to receiving an "up" input), and/or can be a media identifier element at a default position (e.g., where there are multiple default positions and a directional input selects among the multiple default positions). In some embodiments, a media interface can be highlighted in response to navigation from a non-media interface element that was highlighted (e.g., in response to directional inputs).

Referring back to FIG. 2, process 200 can determine that a media content item has been selected from one or more media interfaces at 220. For example, when a media interface represents multiple media content items, process 200 can determine that a media content item from the multiple media content items has been selected. In another example, process 200 can determine that a media content item that is represented by one of multiple media interfaces has been selected. In a more particular example, as shown in FIG. 3B, process 200 can present media interface 304 which represents four media content items (shown in the navigation controls in control interface 310) and determine that one of the media content items associated with media interface 304 has been selected.

Figure 3B:
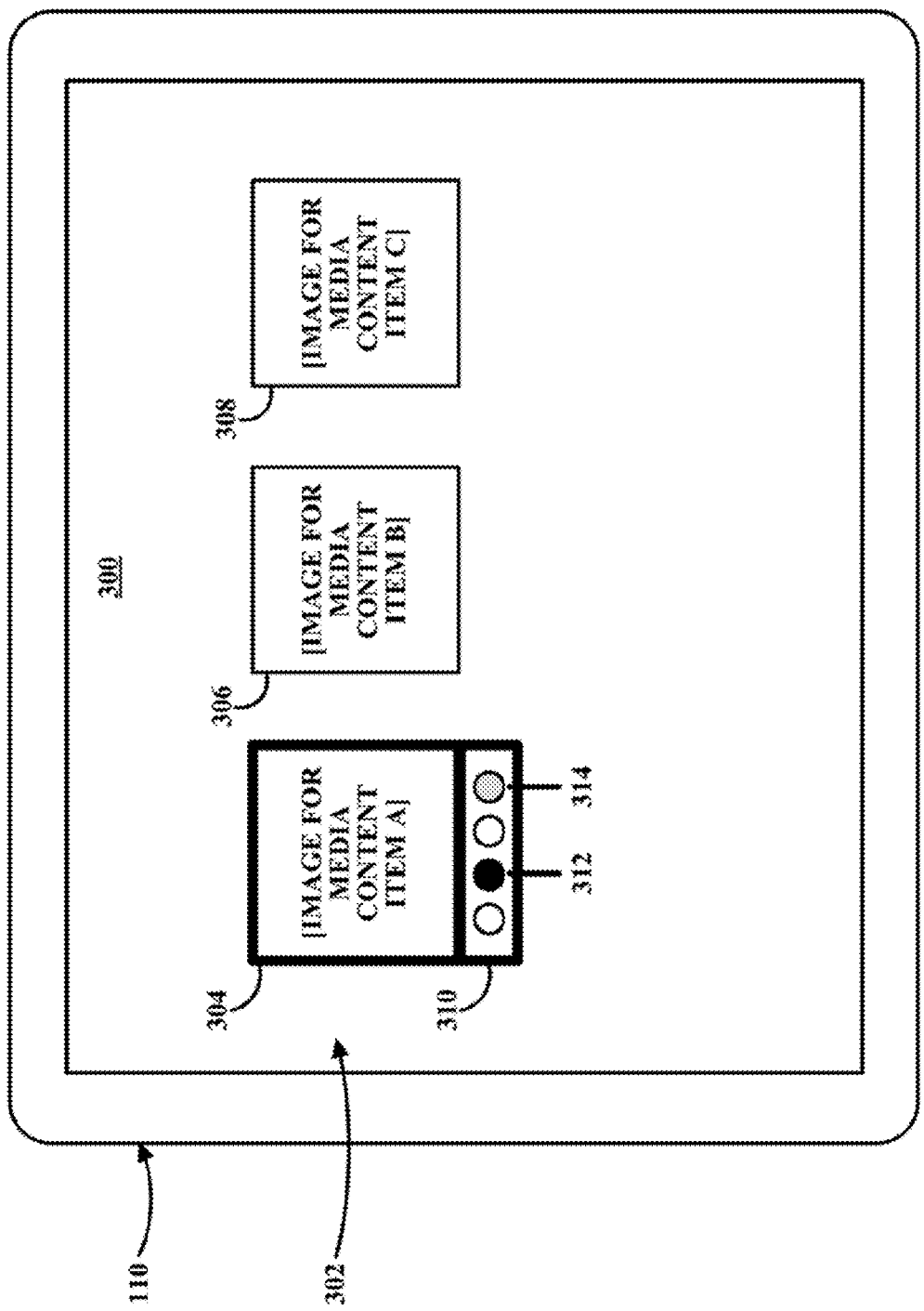
Figure 3C:
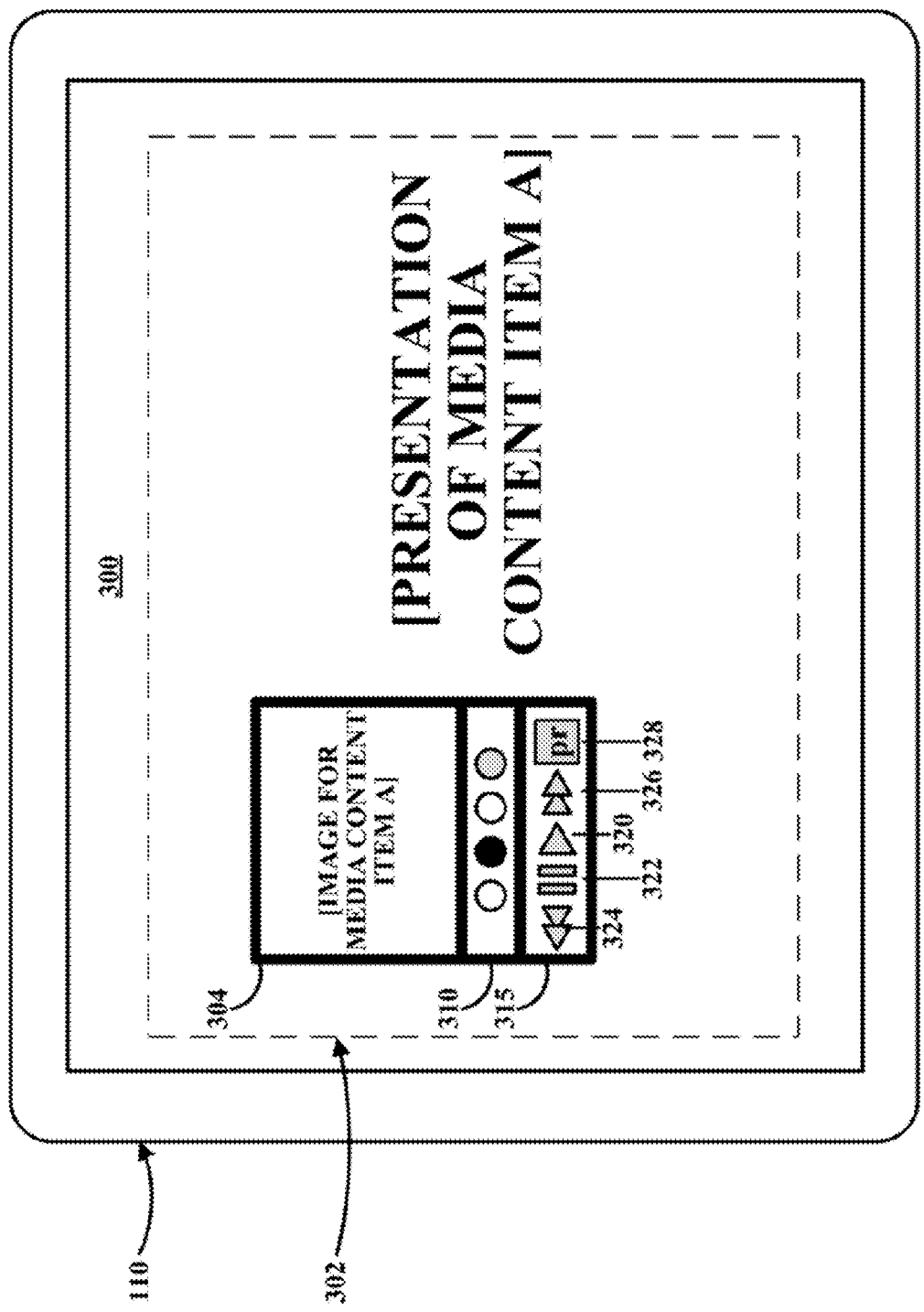

In the embodiment shown in FIG. 3B, process 200 can determine that media interface 304 has been selected and, upon determining that media content interface represents a collection of media content items, can present contextual controls 310 in response to selecting the media interface. For example, in response to highlighting and selecting media interface 304 by providing one or more inputs from a user input device, process 200 can cause one or more contextual controls in the form of navigation options to be presented. Such navigation options can indicate the number of media content items contained in the playlist, the position within the collection of media content items of the media content item currently being presented, and/or the position within the collection of media content items of the media content item currently being navigated to. For example, as shown in FIG. 3B, the navigation options in contextual controls 310 can include multiple icons, such that the number of icons indicates the number of media content items contained in the playlist. In some such embodiments, any suitable icons, text, images, graphics, and/or any other suitable content can be included in the playlist indicator. As another example, in some embodiments, the playlist indicator can include a block of text stating the number of items contained in the playlist. The position of playlist indicator in media interface 304 is merely an example, and the playlist indicator in the navigation options can be presented at any suitable position.

In response to determining that a media content item has been selected, process 200 can present the media content item concurrently with the media interface at 230. For example, as shown in FIG. 3C, the media content item, such as a video, is concurrently presented along with media interface 304 on display 302 of media device 110. It should be noted that the media content can be presented along with the media interface in any suitable manner. For example, the media interface can be overlaid on top of the media content. In another example, the media interface can be presented on the left side of user interface 300 without obstructing the presentation of the media content.

At 240, process 200 can cause a control interface having one or more contextual controls to be presented concurrently with the presented media content item and the presented media interface. The contextual controls can be based on, for example, information relating to the media interface and/or the media content item. For example, as described above, process 200 can determine that media interface 304 has been selected and, upon determining that media content interface represents a collection of media content items, can present contextual controls 310, such as navigation controls for navigating through a stack or collection of media content items in response to selecting the media interface. In another example, as also shown in FIG. 3C, upon determining that a media content item has been selected for presentation, contextual controls relating to the media content type can be presented. In a more particular example, FIG. 3C shows that media playback controls 315 for controlling the playback and/or presentation of the currently presented media content item can be presented. Media playback controls can include any suitable media playback option, such as playing the media content item (a play option 320), pausing the media content item (a pause option 322), rewinding the media content item (a rewind option 324), fast forwarding the media content item (a forward option 326), stopping the media content item, skipping the media content item, liking the media content item or providing any other suitable indication of sentiment (e.g., a like option), requesting that related media content items be presented (a play related option 328), placing the media content item in a queue for consumption at a later time, subscribing to a content provider providing the media content item, accessing other content items provided by the content provider that is providing the media content item (e.g., a channel option), and/or any other suitable media playback option relating to the selected media content item.

In some embodiments, control interfaces and/or their respective contextual control options can be selected based on any suitable criterion. For example, media playback options in a control interface can be selected based on media type (e.g., particular options for video playback), media interface type (e.g., particular options for a playlist of media content items), content creator (e.g., particular options for accessing or subscribing to other content), user information (e.g., particular options for sharing and/or social media), etc.

In a more particular example, playback options 320-326 can be provided in the control interface in response to determining that media interface 304 represents a media asset of a particular media type (e.g., a video, a slideshow, an audio clip, etc.).

In another more particular example, navigation options can be provided in the control interface in response to determining that media interface 304 is a media interface type that represents a collection or playlist of media assets of various media types. In response to navigating through and/or selecting a media asset within the collection or playlist, the media interface 304 can present an integrated control interface that corresponds to the selected media asset (e.g., a play button for a video asset, a back button and a forward button for a slideshow asset, etc.), where the control interface can be modified as the user navigates through different media assets.

In yet another more particular example, social media options can be provided in the control interface in response to determining social media information associated with the user of media device 110 and/or the content creator of the selected media asset. Social media options can include a like option that is presented in response to determining that a social media account has been registered with media device 110. The like option can also be included in response to determining that the content creator is associated with a social media account that can accept sentiment indications (e.g., like, dislike, ratings, etc.).

In a further more particular example, related content options can be provided in the control interface. For example, a channel option can be provided in the control interface in response to determining that the content creator has a page containing other media content items for consumption and/or in response to determining that the content creator has other media content items available for consumption. In another example, a play related option can be presented in the control interface for receiving a request indicating that a user of media device 110 wants media content related to the currently presented media content item and/or media interfaces related to media interface 304 to be presented. In some embodiments, selection of the play related option can cause one or more media interfaces each representing a media content item or a playlist of media content items related to the currently presented media content item to be presented.

It should be noted that the control interface can have any suitable layout. For example, as shown in FIG. 3C, the control interface 310 is presented beneath a portion of media interface 304 that includes media interface elements (e.g., a thumbnail, a title, etc.) and control interface 315 is presented beneath control interface 310. In a more particular example, control interface 310 includes navigation options and control interface 315 includes media playback options. Alternatively, in response to determining that a group of contextual controls is to be presented, one or more previously presented contextual controls can be removed prior to presenting the next group of contextual controls.

It should also be noted that contextual controls can be presented in any suitable manner. For example, as shown in FIGS. 3A-3C, in response to concurrently presenting the media interface that identifies the currently presented media content item along with the media content, the contextual controls can be integrated within the media interface such that the contextual controls, which were previously unavailable while navigating through media interfaces, are revealed to control the selected media interface or one or more media content items associated with the selected media interface. In a more particular example, the contextual controls can be presented as a portion of the media interface. In another more particular example, the contextual controls can be associated with an animation file that, when executed on a media devices, causes the elements associated with the contextual controls to fade in, slide out, and/or any other suitable technique from the media interface. In such an example, the contextual controls can be initially hidden and can appear when it is determined that the media interface element has been selected. In a more particular example, the control interface can be associated with an animation file that causes it to slide in from the right, bottom, top, or left of the media interface when it is determined that the media interface has been selected. In another more particular example, prior to the control interface slide in, fading in, or performing any other suitable action, the previously presented control interface can slide out, fade out, or perform any other suitable action where the previously presented control interface is removed from the media interface.

In some embodiments, any suitable audio can be presented in association with the animation. Alternatively, no audio can be presented in association with the animation.

In some embodiments, the animation file associated with the contextual control interface can be executed based on one or more factors (e.g., a device type, a speed of a data connection, and/or any other suitable factors). For example, in response to determining that media device 110 has the processing capability to execute the animation file associated with the contextual control interface, the animation file can be executed in connection with the appearance of particular contextual controls. In another example, one group of contextual controls can be presented using an animation that causes the contextual controls to slide out from the media interface, while another group of contextual controls can appear from the media interface without using such an animation.

Referring back to FIG. 2, in some embodiments, process 200 can determine whether another control interface, such as a secondary control interface, is associated with the currently presented contextual controls at 250. For example, the selection of one of the contextual controls can cause one or more secondary controls to be presented (e.g., where the originally displayed contextual controls slide into the media interface while other contextual controls slide out from the media interface), can modify the presentation of the media interfaces and additional media interfaces in the user interface (e.g., pagination where additional media interfaces are displayed), can modify the currently presented media content item (e.g., pause the video content item), and/or can modify the media interface (e.g., load related video content items or related collections of video content items).

In a more particular example, in response to determining that a media interface represents a collection of video content items, a first group of contextual controls can be presented that includes navigation options (e.g., having indicators that show which video content item in the collection of video content items is being played back and that show which video content item is currently being navigated to) and, upon selecting a media content item and determining that a second group of contextual controls is associated with the navigation options, the second group of contextual controls can be presented that includes video playback options (e.g., for controlling the playback of the video content item).

In some embodiments, in response to determining that another control interface or other contextual controls are not associated with the currently selected control from the control interface at 260, process 200 can execute the command associated with the selected control. For example, as shown in FIG. 3C, control interface 315 includes a play option 320. In response to selecting play option 320, the media content that is presented in user interface 300 on display 302 of media device 110 can be played back.

In some embodiments, in response to determining that another control interface or other contextual controls are associated with the currently selected control from the control interface at 270, process 200 can execute the command associated with the selected control and/or present the associated control interface and its contextual controls concurrently with the media interface and the media content item. For example, as shown in FIG. 3C, in response to determining that the navigation options in control interface 310 allow the user to navigate through and/or select a media content item and in response to determining that a media content item has been selected for presentation, control interface 315 can be presented concurrently with media interface 304 and the media content that is presented in user interface.

As described above, these secondary control interfaces having contextual controls can be presented in any suitable manner. For example, as shown in FIG. 3C, the secondary control interfaces, such as control interface 315, are aligned with and attached below the first control interface (e.g., control interface 310). In another example, control interface 310 can be animated such that it disappears from below media interface 304 and control interface 315 can be animated such that is appears from below media interface 304. In yet another example, control interface 310 can be removed from below media interface 304 without executing an animation file and control interface 315 can be animated such that it appears from below media interface 304. In a further example, control interface 310 can continue to be presented, but can be de-activated or otherwise inhibited from being selected (e.g., darkened, faded, etc.).

Figure 3D:
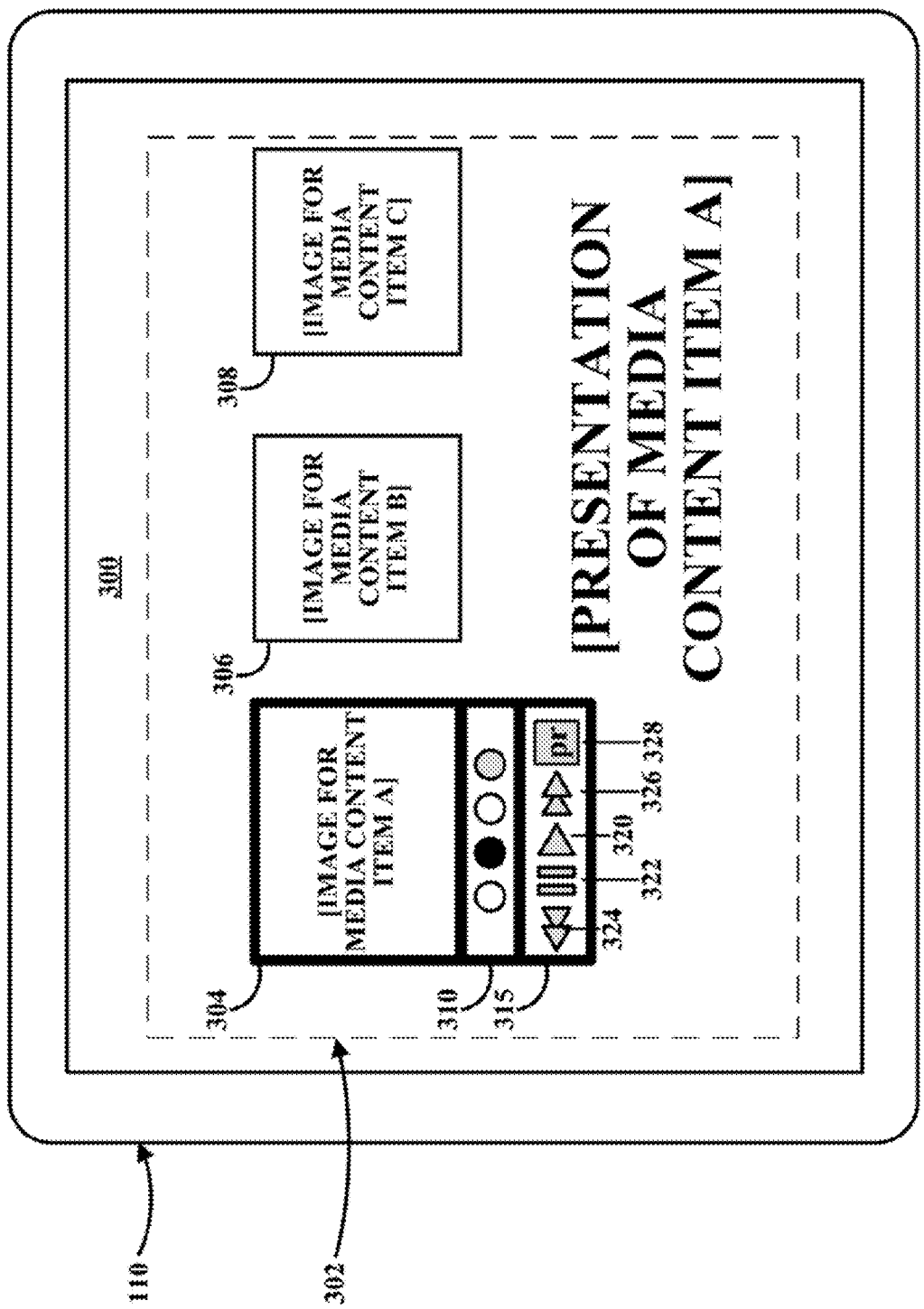

It should also be noted that, in some embodiments, the directional inputs that can be received from a user input device can be based on the layout of the control interface. For example, as shown in FIGS. 3B-3D, a selected portion of a control interface can be activated in response to receiving a directional input from a user input device to navigate in a vertical direction (e.g., an "up" directional command or a "down" directional command). As also shown, the options associated with the selected portion of the control interface can be navigated in response to receiving a direction input from the user input device in a horizontal direction. Alternatively, a portion of a control interface can be activated in response to receiving a directional input in a horizontal direction and the options associated with the selected portion of the control interface can be navigated in response to receiving a directional input in the vertical direction.

It should further be noted that, although control interfaces 310 and 315 in FIGS. 3B-3D include control interfaces that are aligned with and integrated below the media interface, this is merely illustrative. Any suitable number of control interfaces can be provided as part of the media interface and each control interface can have any suitable layout. For example, a first contextual control interface can be configured to appear from the media interface to allow the user to navigate through a playlist of media content items, a second contextual control interface can be configured to appear from the media interface to allow the user to control playback or presentation of a particular media content item, and a third contextual control interface can be configured to appear from the media interface to allow the user to share, like, or perform social media functions associated with a particular media content item (e.g., when pausing the media content item, when the presentation of the media content item has ended, etc.). These various control interfaces can be activated and de-activated based on receiving particular directional inputs from a user input device and/or receiving particular user actions (e.g., selecting a media content item of a particular media type).

In some embodiments, multiple control interfaces can be presented concurrently with the consumption of a media content item and/or when navigating through various media interfaces that each represent one or more media content items. For example, FIG. 3C illustrates that multiple control interfaces 310 and 315 can be presented concurrently with the presentation of media content—e.g., one control interface that controls the navigation through multiple media content items represented by a media interface and another control interface that controls the current media content item. In another example, FIG. 3D illustrates that multiple control interfaces can also be presented concurrently with the presentation of multiple media interfaces. In this example, a preview of the media content item currently navigated to in the media interface can be presented as part of the media interface and the navigation control options in second portion 314 of control interface 310 can be used to control the presentation of the preview. The preview can include any suitable content, such as a slideshow of images relating to the media content item, a video snippet of the media content item, etc.

It should be noted that the above steps of the flow diagram of FIG. 2 can be executed or performed in any order or sequence not limited to the order and sequence shown and described in the figure. Also, some of the above steps of the flow diagram of FIG. 2 can be executed or performed substantially simultaneously where appropriate or in parallel to reduce latency and processing times. Furthermore, it should be noted that FIG. 2 is provided as examples only. At least some of the steps shown in these figures may be performed in a different order than represented, performed concurrently, or altogether omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for providing media guidance with contextual controls are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for media guidance, the method comprising:
causing a user interface to be presented that includes a plurality of media interface elements, wherein each of the plurality of media interface elements is a selectable object that represents at least one media content item, and wherein at least one of the plurality of media interface elements represents a plurality of videos;
determining, using a hardware processor, that the media interface element that represents the plurality of videos has been selected;
in response to determining that the media interface element that represents the plurality of videos has been selected, augmenting the selected media interface element with a first control interface that is associated with the selected media interface element, wherein the first control interface includes a first plurality of controls, and wherein selection of one of the controls in the first plurality of controls causes a second selectable object that represents a corresponding video in the plurality of videos to replace the selectable object associated with the media interface element that represents the plurality of videos;
determining that a video from the plurality of videos has been selected using the first control interface;
in response to determining that the video from the plurality of videos has been selected, causing the video to be played back in a first portion of the user interface;

augmenting the selected media interface element with a second control interface that includes a second plurality of controls that control playback of the video being played back in the first portion of the user interface;
concurrently with causing the video to be played back in the first portion of the user interface, causing the augmented selected media interface element to be presented in a second portion of the user interface; and
inhibiting presentation of the non-selected media interface elements.

2. The method of claim 1, wherein the plurality of media interface elements are arranged along a direction from a position of the user interface.

3. The method of claim 1, wherein the first plurality of controls are inhibited from being presented in response to activating the second plurality of controls.

4. The method of claim 1, further comprising causing the first plurality of controls to be removed from the user interface and causing the second plurality of controls to be presented in the user interface, wherein the second plurality of controls is aligned with the selected media interface element.

5. The method of claim 1, wherein the first plurality of controls for navigating through the plurality of media content items further comprises:
  a first indicator that indicates a first navigation position from a plurality of navigation positions, wherein each of the plurality of navigation positions corresponds to a video from the plurality of videos and wherein the first navigation position corresponds to the video that is being played back; and
  a second indicator that indicates a second navigation position from the plurality of navigation positions, wherein the second navigation position corresponds to one of the plurality of videos that has been navigated to.

6. The method of claim 1, further comprising:
  determining whether the selected media interface element is associated with a single media content item or a plurality of media content items; and
  selecting the control interface that appears from the selected media interface element based on the determination.

7. The method of claim 1, further comprising:
  receiving an input from a user input device;
  determining a first direction associated with the received input; and
  causing one of the plurality of controls in the control interface to be highlighted or causing one of the plurality of media interface elements to be highlighted based on the determined direction.

8. A system for media guidance, the system comprising:
  a hardware processor that is configured to:
    cause a user interface to be presented that includes a plurality of media interface elements, wherein each of the plurality of media interface elements is a selectable object that represents at least one media content item, and wherein at least one of the plurality of media interface elements represents a plurality of videos;
    determine that the media interface element that represents the plurality of videos has been selected;
    in response to determining that the media interface element that represents the plurality of videos has been selected, augment the selected media interface element with a first control interface that is associated with the selected media interface element, wherein the first control interface includes a first plurality of controls, and wherein selection of one of the controls in the first plurality of controls causes a second selectable object that represents a corresponding video in the plurality of videos to replace the selectable object associated with the media interface element that represents the plurality of videos;
    determine that a video from the plurality of videos has been selected using the first control interface;
    in response to determining that the video from the plurality of videos has been selected, cause the video to be played back in a first portion of the user interface;
    augment the selected media interface element with a second control interface that includes a second plurality of controls that control playback of the video being played back in the first portion of the user interface;
    concurrently with causing the video to be played back in the first portion of the user interface, cause the augmented selected media interface element to be presented in a second portion of the user interface; and
    inhibit presentation of the non-selected media interface elements.

9. The system of claim 8, wherein the plurality of media interface elements are arranged along a direction from a position of the user interface.

10. The system of claim 8, wherein the first plurality of controls are inhibited from being presented in response to activating the second plurality of controls.

11. The system of claim 8, wherein the hardware processor is further configured to cause the first plurality of controls to be removed from the user interface and cause the second plurality of controls to be presented in the user interface, wherein the second plurality of controls is aligned with the selected media interface element.

12. The system of claim 8, wherein the first plurality of controls for navigating through the plurality of media content items further comprises:
  a first indicator that indicates a first navigation position from a plurality of navigation positions, wherein each of the plurality of navigation positions corresponds to a video from the plurality of media content items videos and wherein the first navigation position corresponds to the video that is being played back; and
  a second indicator that indicates a second navigation position from the plurality of navigation positions, wherein the second navigation position corresponds to one of the plurality of videos that has been navigated to.

13. The system of claim 8, wherein the hardware processor is further configured to:
  determine whether the selected media interface element is associated with a single media content item or a plurality of media content items; and
  select the control interface that appears from the selected media interface element based on the determination.

14. The system of claim 8, wherein the hardware processor is further configured to:
  receive an input from a user input device;
  determine a first direction associated with the received input; and
  cause one of the plurality of controls in the control interface to be highlighted or causing one of the plurality of media interface elements to be highlighted based on the determined direction.

15. A non-transitory computer-readable medium containing computer-executable instructions that, when executed by a processor, cause the processor to perform a method for media guidance, the method comprising:
causing a user interface to be presented that includes a plurality of media interface elements, wherein each of the plurality of media interface elements is a selectable object that represents at least one media content item, and wherein at least one of the plurality of media interface elements represents a plurality of videos;
determining that the media interface element that represents the plurality of videos has been selected;
in response to determining that the media interface element that represents the plurality of videos has been selected, augmenting the selected media interface element with a first control interface that is associated with the selected media interface element, wherein the first control interface includes a first plurality of controls, and wherein selection of one of the controls in the first plurality of controls causes a second selectable object that represents a corresponding video in the plurality of videos to replace the selectable object associated with the media interface element that represents the plurality of videos;
determining that a video from the plurality of videos has been selected using the first control interface;
in response to determining that the video from the plurality of videos has been selected, causing the video to be played back in a first portion of the user interface;
augmenting the selected media interface element with a second control interface that includes a second plurality of controls that control playback of the video being played back in the first portion of the user interface;
concurrently with causing the video to be played back in the first portion of the user interface, causing the augmented selected media interface element to be presented in a second portion of the user interface; and
inhibiting presentation of the non-selected media interface elements.

16. The non-transitory computer-readable medium of claim 15, wherein the plurality of media interface elements are arranged along a direction from a position of the user interface.

17. The non-transitory computer-readable medium of claim 15, wherein the first plurality of controls are inhibited from being presented in response to activating the second plurality of controls.

18. The non-transitory computer-readable medium of claim 15, further comprising causing the first plurality of controls to be removed from the user interface and causing the second plurality of controls to be presented in the user interface, wherein the second plurality of controls is aligned with the selected media interface element.

19. The non-transitory computer-readable medium of claim 15, wherein the first plurality of controls for navigating through the plurality of media content items further comprises:
a first indicator that indicates a first navigation position from a plurality of navigation positions, wherein each of the plurality of navigation positions corresponds to a video from the plurality of videos and wherein the first navigation position corresponds to the at least one video that is being played back; and
a second indicator that indicates a second navigation position from the plurality of navigation positions, wherein the second navigation position corresponds to one of the plurality of videos that has been navigated to.

20. The non-transitory computer-readable medium of claim 15, further comprising:
determining whether the selected media interface element is associated with a single media content item or a plurality of media content items; and
selecting the control interface that appears from the selected media interface element based on the determination.

21. The non-transitory computer-readable medium of claim 15, further comprising:
receiving an input from a user input device;
determining a first direction associated with the received input; and
causing one of the plurality of controls in the control interface to be highlighted or causing one of the plurality of media interface elements to be highlighted based on the determined direction.

* * * * *